No. 695,998. Patented Mar. 25, 1902.
E. W. BEEBE.
OPTOMETER.
(Application filed May 5, 1900.)
(No Model.)
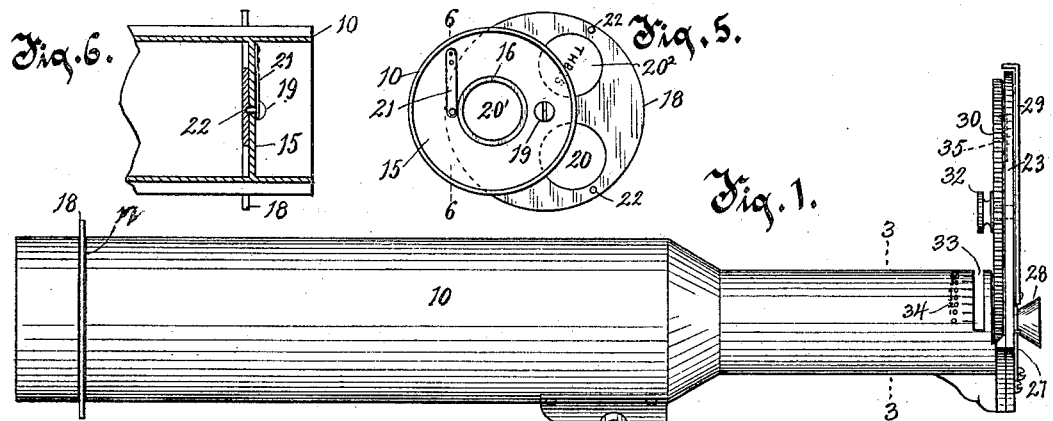
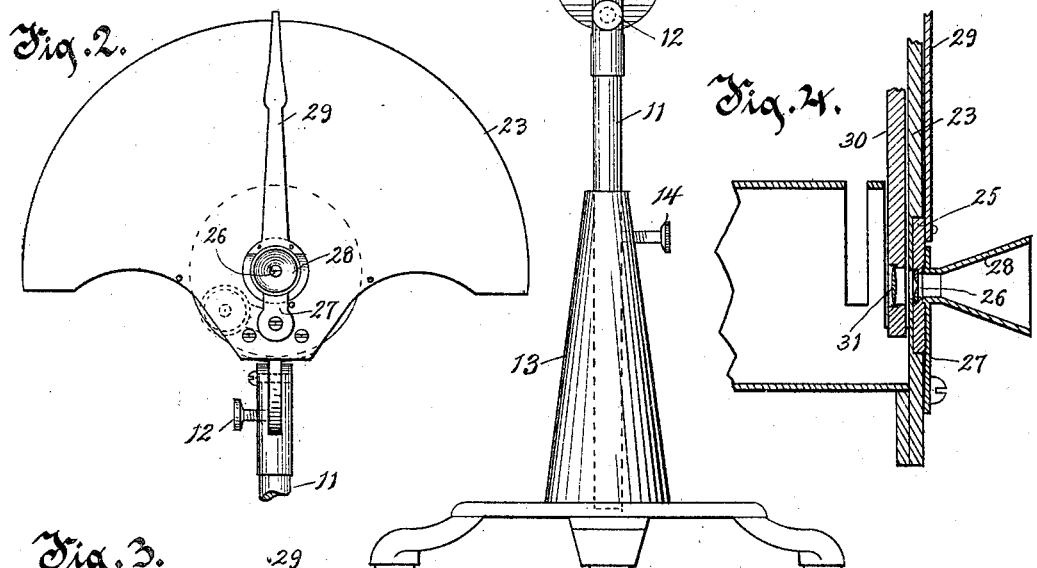
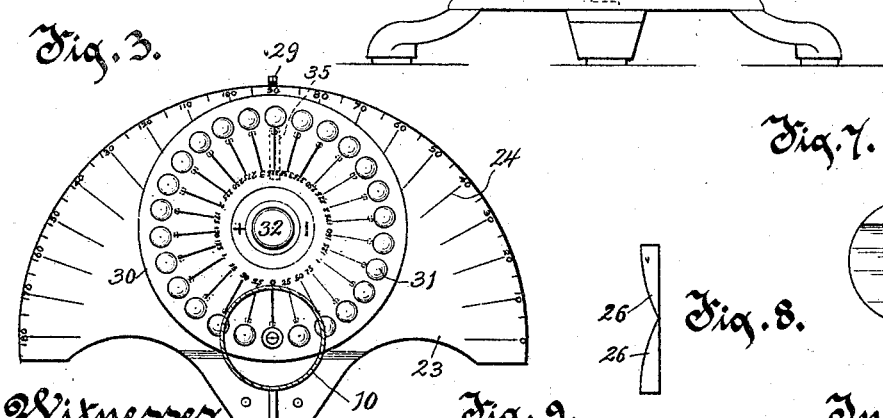
Witnesses.
Inventor.
Eugene W. Beebe
by Benedict & Morsell
Attorneys

UNITED STATES PATENT OFFICE.

EUGENE W. BEEBE, OF MILWAUKEE, WISCONSIN.

OPTOMETER.

SPECIFICATION forming part of Letters Patent No. 695,998, dated March 25, 1902.

Application filed May 5, 1900. Serial No. 15,573. (No model.)

*To all whom it may concern:*

Be it known that I, EUGENE W. BEEBE, of Milwaukee, in the county of Milwaukee and State of Wisconsin, have invented a new and useful Improvement in Optometers, of which the following is a description, reference being had to the accompanying drawings, which are a part of this specification.

My invention relates to an improved instrument adapted to ascertain the amount of presbyopia and the refractive errors in the eye or eyes of a person and to determine the kind and strength of lenses adapted to overcome these errors or imperfections in the vision of such eye or eyes.

Of my improved instrument it can be said generally that the instrument being placed on a table with the rear end opposite an illuminated surface and the eye looking through the eyepiece two disks of light are seen, the positions of which disks with reference to each other determine the error of refraction, presbyopia or hyperopia being indicated when the disks are separated and myopia when the disks overlap, the amount of which error may be measured by rotating the lens plate or frame, (behind the eyepiece,) having therein plus and minus lenses of varying strengths, until the edges of the disks are tangent. Openings of different sizes are provided in the object-plate, and when the larger of these openings is in position near the rear end of the instrument it is adapted for determining the strength and kind of lenses to be worn for seeing distant objects, and when the smaller of the two disk-openings is in position the instrument gives the lenses required for presbyopia and the full amount of hyperopia. When these corrections have been made, a plate containing double cylinders with apices joining is oscillated from side to side in front of the eye, and if the disks of light remain tangent at all parts of the arc through which they appear to move there is no astigmatism; but if at some part of the arc they are separated or they overlap there is astigmatism, plus if separated and minus if the disks overlap. This may be corrected by trial with cylindrical lenses of varying strengths placed in a slot in the tube at the rear of the eyepiece and at the angle indicated by the position of the finger of the cylinder-plate on a dial, the figures on which give the angle of the correcting-lens. When a lens is selected which, placed as above stated, corrects the astigmatism, the disks of light will remain tangent at all parts of the circle when the plate in which the cylinders are mounted is oscillated. When the reading-lenses have been selected in the manner described, a verifying test of the same may be made by removing the plate in which the double cylinders are mounted, and a disk-aperture in the disk-plate having a transparent cover with test-letters thereon may be moved to position into and in front of the sight-opening, and if the lenses thus selected are proper for the patient the test-letters on the transparent disk-aperture will be easily read; but if the letters are blurred the lens-plate may be rotated until the lens giving the best vision is obtained.

The accuracy of this instrument is dependent upon the strength of the double cylinders and the size of the opening or openings in the object-plate. The reason why the accommodation of the eye is suspended in using this instrument is because of the blackened interior surface of the tube and the fact that no object is seen when looking through the instrument. Hence the relaxation of the accommodation.

In the drawings, Figure 1 is a side elevation of my improved instrument. Fig. 2 is a front elevation of the same instrument, the supporting-standard being broken off and omitted. Fig. 3 is a transverse section of the instrument on line 3 3 of Fig. 1 looking toward the right. Fig. 4 is a longitudinal vertical section of substantially so much of the instrument as is illustrated in Fig. 1 at the right of the line 3 3. Fig. 5 is a rear end view of the tube, showing the tube-closing wall and object-plate. Fig. 6 is a longitudinal section of a fragment of the rear end of the tube on line 6 6 of Fig. 5. Fig. 7 shows the cylinders plate with a fragment of the index-finger thereon, the cylinders being in position in the aperture at the rotative axis of the plate. Fig. 8 is an edge view of the two slabs of cylinders of glass that are set with their apices abutting against each other along a middle line in the plate shown in Fig. 7. The slabs are each a portion of a segment of a cylinder and are all glass or an equivalent light-transmitting medium and are herein called "cylinders." Fig. 9 is a slab or segment of a cylinder set in a frame for convenient use in connection with the instrument shown in Fig. 1.

In the drawings, 10 is a tube, preferably of sheet metal, the front portion of which is preferably contracted, as shown at the right in Fig. 1. The interior of the surface of the tube is blackened throughout its entire length. The tube is advisably supported on a standard, which conveniently consists of a post 11, hinged to the tube 10 and secured adjustably thereto by the set-screw 12. The post 11 slides and is adjustable vertically in a base 13, adapted to stand on a table or other convenient support, the post being secured in position adjustably in the base by means of the set-screw 14.

At or near its rear end the tube 10 is provided with a tube-closing wall 15, having a comparatively small circular sight-opening 16. A slot 17 transversely through the tube 10, nearly around it and preferably through it at the sides and at the top, receives therein the object-plate 18, which is preferably in circular form and is pivoted by a pin 19 to the tube-wall 15. The plate 18 may be in circular form and is provided with one or more sight-openings 20 20' 20², which openings are arranged at equal distances radially from the pivot 19 and are so disposed that when brought in front of the sight-opening 16 in the wall 15 they will severally register therewith. In the drawings, Fig. 5, the plate 18 is shown as provided with three sight-openings, one of which, 20', is in registration with the sight-opening 16 in the wall 15 and is slightly smaller diametrically than the opening 20 is. The opening 20² is partially closed with a translucent cover of paper or other thin material, on which a word or words are printed with reference to using the instrument for determining the best lenses to be employed in reading. A spring-catch 21 on the wall 15 has a terminal stud adapted to enter any one of the sockets 22 in the plate 18 and lock the plate releasably in position, with one of the apertures 20, 20', or 20² in registration with the aperture 16 in the wall-plate.

At the front end the tube 10 is provided with a plate 23, preferably of metal, which closes the end of the tube, except only as to a small sight-aperture or eye-opening centrally of the tube, and this plate projects radially, laterally, and upwardly, terminating in a semicircular edge, that is provided with a scale 24, divided into parts and numbered from "1" to "180," in accordance with the degrees of a semicircle in the method common for indicating angles to the horizon or to a horizontal plane. A cylinders-holding or eye plate 25 in circular form is fitted rotatively in a circular recess therefor in the front surface of the plate 23, the eye-plate being so disposed as to be concentric with the eye-aperture through the plate 23. The optical slabs (herein denominated "cylinders") 26 26 are mounted in a central aperture therefor in this plate 25, the straight edges of the apices of the slabs abutting against each other across the aperture diametrically. Each of these optical slabs or cylinders 26 consists of a slab or segment longitudinally of a cylinder, the slab or segment having a flat surface and a curved surface intercepting each other in a straight line, along which straight lines the two slabs employed contact, the flat surfaces of the two slabs being disposed in the same flat plane. The eye-plate 25 is held movably and releasably in place in the plate 23 by means of an elastic arm 27, pivoted on the plate 23 and adapted to swing over and in front of the eye-plate 25, the eye-plate being provided with a funnel-shaped eye-tube 28, the inner end of which projects through the arm 27 and is adapted to enter a circular recess therefor in the eye-plate 25, the recess being concentric with the sight-aperture, so that when the arm 27 is in position over the plate 25 the tube 28 registers with the aperture through the eye-plate in which the cylinders 26 are mounted. The eye-plate 25 is provided with a radially-projecting finger 29, the free end of which is turned over the edge of the plate 23 and serves for an index on the scale 24, preferably located on the rear surface of the plate 23.

A plate 30, pivoted on the plate 23 against the rear surface thereof, is provided with a milled edge, by means of which it may be rotated, and with a large number of lenses 31, mounted in a series arranged angularly in apertures therefor, the lenses being radially at equal distances from the axis of the plate and so disposed as severally to register with the eye-aperture through the plate 23. These lenses are composed of plus and minus sets, the lenses of each set being of different strengths for ascertaining the imperfection or defect of vision as to presbyopia or myopia. In Fig. 3 of the drawings the set of convex lenses is indicated by heavy black radial lines, except in case of the heavy black radial line marked O, which is opposite an aperture in the plate—that is, an aperture having no lens—and the concave lenses are indicated by the lighter radial lines running thereto. The strength of those lenses is indicated by the figures on the plate 30 at the inner ends of the radial lines. A pin 32 through plate 30 turns by screw-thread into plate 23 and supports plate 30 revolubly. A spring-catch 35 on the plate 23 takes into sockets therefor in the lens-plate 30 and holds it releasably. The tube 10 is slotted transversely to receive the plate 30 therein from the top to below the central end eye-orifice.

A transverse slot 33 in the tube 10 a little at the rear of the plate 30 is provided for inserting the segment of a cylinder (or what is denominated a "cylindrical" lens, Fig. 9) to correct and obviate the abnormal effects of astigmatism. A transverse scale 34 is placed on the tube adjacent to the slot 33, which corresponds in the angles indicated by its figures with the angles indicated by the figures of the scale 24 on the plate 23. A glass or lens of this segment-of-cylinder character is shown in Fig. 9 mounted in a frame for convenient handling. The longitudinal axis of the segment is indicated by fragments of lines on the glass or frame adjacent to the glass.

It should be observed that in this instrument the wall 15 and the apertured object-plate 18 are located at a distance from the cylinders 26 about equal to the usual focal distance for reading, say, substantially fourteen inches, and that being so located the apertures in the disk must be made of sizes to correspond optically with the cylinders employed in order to correctly determine the proper power of the lenses required for reading or for distance glasses, which sizes of apertures are indicated by the contact of the edges of the apertures as seen in the instrument.

In use the instrument is placed before the patient in some convenient position, the rear end being directed to an open field of light or an illuminated surface. The eye-plate 25, with its cylinders 26, being in place, the lens-plate 30 is rotated to bring the aperture opposite the zero ("0") in registration with the cylinders or sight-aperture in the eyepiece. Then if the test is to be made on the eyes of a young person or for distance-glasses on the eyes of an old person the larger aperture 20 in the plate 18 is brought into registration with the aperture 16 in the wall 15. If the test is to be made for reading-glasses for an elderly person, the smaller aperture 20' is brought into registration with the aperture 16. Thereupon the patient is directed to look through the front aperture into the instrument, when two light-disks will be seen, and if not tangent to each other the lens-plate 30 is rotated to bring a lens into registration with the eye-aperture which will cause them to become so. This determines, in a general way, the lens required. Thereupon the plate 25 is oscillated to ascertain if there is any astigmatism. If there is any defect in the eye of this character, the circular fields of light will separate from each other at some portion of the arc as the plate 25 is oscillated or they will overlap during portions of their oscillatory movement. The finger 29 being thus oscillated is stopped at the point where there is the greatest separation or overlapping of the fields of light. This indicates the angle at which astigmatism is found to be present. To correct this astigmatism, a cylindrical lens or slab of a cylinder of the character of the one shown in Fig. 9 (a form in common use) is placed in the slot 33, the angle of which, usually shown by short lines thereon, must be the same as the angle of the cylinders or slabs in plate 25, these corresponding angles being shown by corresponding numerals on the scales 24 and 34. The cylinder or slab placed at the angle determined in the slot 33 to correct the astigmatism must be of proper strength for that purpose, and this is ascertained by tests. It should be stated that though the apertures in the object-plate 18 are circular in form and the fields of light through them are herein spoken of as "circular" fields, yet as a fact, because of the employment of the slabs of cylinders in the eyepiece, these fields of light are really somewhat elongated or oval in form, the ends only of the oval fields of light coming together or contacting. By this means enlarged fields of light are obtained with a limited and clearly-defined contact when comparatively weak cylinders are employed, which would not be secured with prisms or spherical lenses of corresponding strength. To verify these corrections, the eye-plate 25 is removed from the instrument and the covered aperture $20^2$ in the plate 18 is rotated in front of the aperture 16, and thereupon the patient looking through the lens in the plate 30 and the cylinder in the slot 33 should see the words or reading on the covering of aperture $20^2$ perfectly. If not perfect, the lens-plate 30 is to be rotated to bring a little stronger or weaker lens in place to perfect the corrections.

It will be noted that this instrument is adapted both for selecting lenses of proper strength for the use of the person either for reading or for distance glasses and that also the errors of astigmatism may be discovered and corrected therewith, and it is believed that this is the first instrument produced by which lenses can be ascertained and determined upon adapted for reading and for the correction of astigmatism without first testing the eyes for distant objects.

What I claim as my invention is—

1. In an optometer, an optical medium, consisting of a pair of slabs or segments of a cylinder in a common plane with their apices abutting on a line centrally of the line of vision.

2. In an optometer, a plate having a sight-aperture, and an optical medium consisting of a pair of slabs or segments of a cylinder set in a common plane in the aperture of the plate, their apices abutting on a line diametrically of the aperture in the plate.

3. In combination an optical tube, a plate affixed to and closing the front end of the tube except a central sight-aperture, an eye-plate provided with a sight-aperture and having a pair of optical segmental slabs of cylinders fixed in the plate, the eye-plate being revoluble on and removable from the fixed plate the sight-apertures registering one with the other, and a swinging arm provided with a sight-aperture arranged to be swung over the eye-plate so that the aperture will register with the sight-aperture in the eye-plate and adapted to hold the eye-plate in position removably on the fixed plate.

4. In combination, an optical tube, a plate affixed to and closing the front end of the tube except a central sight-aperture, an angle-scale arranged in an arc on the fixed plate concentric with the sight-aperture, an eye-plate revoluble on the fixed plate and provided with optical segmental slabs of a cylinder fixed with their apices abutting against each other in a sight-aperture in the eye-plate, a finger on the eye-plate disposed as an index on the scale on the fixed plate, and a transversely-disposed scale on the tube near the front end adjacent to a transverse slot therein, the two scales being adapted to indicate angles of inclination to a common plane.

5. In combination an optical tube, a plate at a right angle thereto affixed to and closing the front end of the tube except a sight-aperture and provided with an angle-measuring scale, an eye-plate provided with optical mediums and an index-finger, the eye-plate being revoluble in front of the fixed plate, a lens-plate provided with lenses of varying strengths so mounted in the plate as to be capable of being severally brought into registration with the sight-aperture in the fixed plate, and a transversely-disposed angle-scale on the tube adjacent to a transverse slot therein.

6. In combination, an optical tube, optical mediums mounted therein at the front end of the tube, means near the rear end of the tube for closing the tube except a small circular aperture centrally thereof, and a movable plate having a plurality of apertures one of which has a translucent closure, the plate being located adjacent to and adapted to be moved to bring the apertures therein severally into registration with the small central aperture in said means for partially closing the tube.

7. In combination, an optical tube, a lens or lenses at the front end of the tube adapted for accommodating the eye to see clearly and distinctly the field of light through a smaller circular aperture near the rear end of the tube, other optical means at the front end of the tube for testing the sight for astigmatism, and a plate having circular apertures, one of which apertures is smaller than the normal field of light admitted at the rear end of the tube and another of which apertures has a translucent closure adapted to be placed in and transversely of the tube near its rear end to limit the field of sight through the sight medium at the front end of the tube.

8. In combination, an optical tube, a transverse wall near its rear end at a distance from the patient's eyepiece provided with a sight-aperture, an eccentrically-apertured object-plate pivoted on said wall in a transverse slot therefor in the tube and adapted to be rotated so as to bring its apertures severally into registration with the aperture in said wall, and eye-testing optical mediums on the tube at the front end thereof.

9. In combination in an optometer, a tube provided with optical mediums at its front end, a transverse wall provided with a central aperture, the wall being located in the tube at substantially the normal focal distance for reading from the optical mediums at the front end of the tube, a circular object-plate pivoted on said wall eccentrically and provided with a plurality of openings one of which is covered by a light-transmitting medium having flat surfaces in parallel planes, and all of said openings in said disk being so disposed as when the disk is revolved to register severally with the central sight-aperture in the wall, and means adapted to lock the object-plate releasably in registration with the transverse wall.

10. In combination, an optical tube, a plate closing the front end of the tube except a central sight-aperture, a revoluble eye-plate provided with a sight-aperture and having fixed therein a pair of optical segmental slabs of cylinders meeting on the straight line formed on each slab by the interception of its curved and its flat surface, the flat surfaces of the two slabs being in the same plane, a rotatable lens-plate mounted at the rear of the fixed plate, a tube-closing wall provided with a central aperture and located in the tube at substantially the normal focal distance for reading from the eye-plate, and a circular object-plate pivoted on said wall eccentrically and provided with circular apertures arranged at equal distances from its axis and so disposed as to register severally with the sight-aperture in the wall.

11. In combination in an optometer, a tube provided with optical mediums at its front end, a transverse wall provided with a central aperture, the wall being located in the tube at substantially the normal focal distance for reading from the optical mediums at the front end of the tube, a circular object-plate pivoted on said wall eccentrically and provided with a circular opening located at a distance from its axis and so disposed as to register with the central sight-aperture in the wall, and means adapted to lock the object-plate releasably in registration with the transverse wall.

12. In combination in an optometer, a tube provided with optical mediums at its front end, a transverse wall provided with a central aperture the wall being located in the tube at substantially the normal focal distance for reading from the optical mediums at the front end of the tube, a circular object-plate pivoted on said wall eccentrically and provided with a circular opening covered by a light-transmitting medium of a form and quality adapted to permit light to pass through it in line straight with and continuous of the lines of light coming thereto arranged at a distance from its axis and so disposed as to register with the central sight-aperature in the wall, and means adapted to lock the object-plate releasably in registration with the transverse wall.

In testimony whereof I affix my signature in presence of two witnesses.

EUGENE W. BEEBE.

Witnesses:
C. T. BENEDICT,
ANNA V. FAUST.